United States Patent [19]

Horner et al.

[11] 4,017,123
[45] Apr. 12, 1977

[54] DUAL LAYER HEAT SHIELD FOR WHEELS

[75] Inventors: Richard F. Horner; Jaring Vander Veen, both of South Bend, Ind.

[73] Assignee: The Bendix Corporation, South Bend, Ind.

[22] Filed: Apr. 2, 1976

[21] Appl. No.: 673,232

[52] U.S. Cl. .......................... 301/6 WB; 188/264 G
[51] Int. Cl.² ........................................ B60B 19/00
[58] Field of Search ................. 301/6 R, 6 A, 6 CS, 301/6 WB, 37 R; 188/264 G

[56] References Cited
UNITED STATES PATENTS

| | | | |
|---|---|---|---|
| 3,051,528 | 8/1962 | Rogers | 301/6 CS |
| 3,958,833 | 5/1976 | Stanton | 301/6 WB |

*Primary Examiner*—Robert B. Reeves
*Assistant Examiner*—H. Grant Skaggs
*Attorney, Agent, or Firm*—Ken C. Decker

[57] ABSTRACT

A heat shield particularly adapted for use with a wheel surrounded multiple disc brake wherein the wheel is provided with a plurality of circumferentially spaced apart fixed drive keys extending into drivable engagement with a plurality of brake rotor discs. The heat shield is defined by spaced apart wall portions fixedly secured together to form a rigid structure permitting air flow between the wall portions thereof. The heat shield is removably secured in position between adjacent drive keys and in radially spaced apart relationship to the tire supporting rim portion of the wheel to thereby resist heat transfer radially outwardly from the brake to the rim portion and retain heated brake debris discharged radially outwardly by the rotor discs.

10 Claims, 7 Drawing Figures

DUAL LAYER HEAT SHIELD FOR WHEELS

BACKGROUND OF THE INVENTION

The use of heat shields in the above mentioned disc brake environment is known in the art as evidenced by U.S. Pat. No. 3,051,528 in the name of R. Rogers and assigned to the assignee of the present application. The present invention is an improvement over the heat shield shown and described in U.S. Pat. No. 3,051,528 in that it is more rigid structurally and provides more positive protection against heat transfer to the wheel in the case of high performance disc brakes as, for example, that used in heavy jet propelled aircraft which take off and land at relatively high speeds. Under certain operating conditions such as an aborted or rejected take-off, a total braking effort is exercised resulting in an extreme heated condition of the frictionally engaged rotor and stator discs of the brake as well as the remaining brake structure in the immediate vicinity of the rotor and stator discs. The heat load imposed on the brake causes material therein such as metallic base friction lining or pads to become semi-molten. The semi-molten material as well as other heated brake debris is thrown radially outwardly by the rotor discs against the heat shield which, if not sufficiently strong, will flex or collapse under the load imposed thereon and contact the tire supporting rim portion of the wheel thereby establishing an undesirable direct heat flow path to the rim portion and tire mounted thereon. The resulting heating of the rim portion and/or tire may produce localized highly stressed areas thereof and subsequent structural failure of the wheel and/or tire which, for obvious reasons, has disastrous results on the aircraft supported thereby.

SUMMARY OF THE INVENTION

The present invention relates to a heat resistance shield adapted to insulate a tire supporting rim portion of a wheel from a heated disc brake mounted radially inwardly of the rim portion.

It is an object of the present invention to provide a structurally rigid heat shield for minimizing heat flow from a disc brake to a wheel rim radially outwardly therefrom and for retaining heated brake debris radially inwardly away from the wheel rim.

It is another object of the present invention to provide a dual layer heat shield removably secured to a wheel rim to resist heat flow to the wheel rim from a heated disc brake mounted radially inwardly from the wheel rim.

Other objects and advantages of the present invention will be apparent from the following description taken with the accompanying drawings.

DESCRIPTION OF THE PREFERRED EMBODIMENT

Figure 1:
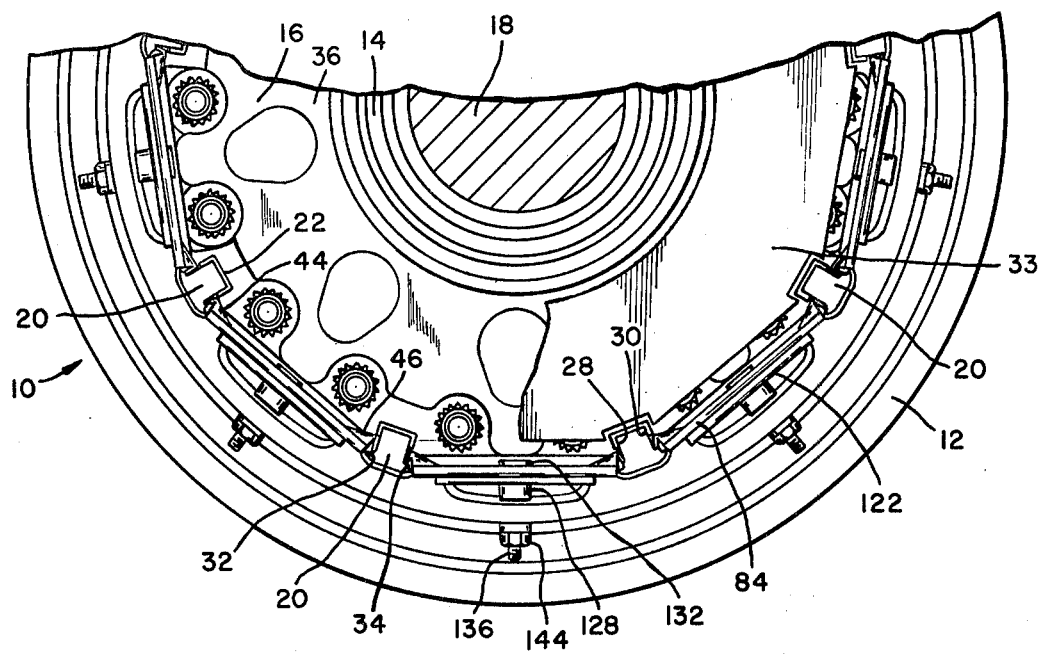
FIG. 1 is a schematic plan view of a portion of an aircraft wheel embodying the present invention.

Referring to FIG. 1, in particular, numeral 10 designates a conventional aircraft wheel having a rim portion 12 upon which an inflatable tire, not shown, is mounted. A central hub portion 14 connected to rim portion 12 via a web portion 16 is rotatably mounted by suitable bearing means, not shown, to an axle 18. A plurality of rotor disc drive key members are defined by circumferentially spaced apart axially extending bosses 20 formed on the radially innermost wall of rim portion 12 each of which bosses 20 receives a U-shaped cap member 22 fixedly secured thereto by spaced apart screw members 24 and 26 threadedly engaged with boss 20. The bosses 20 may extend axially beyond the adjacent edge of rim portion 12 as shown at 23. The cap members 22 are slidably engaged axially with mating slots in one or more rotor discs and rotatably drive said rotor discs. One rotor disc 33 is partially shown engaged with several rotor disc drive key members. Sidewalls 28 and 30 of cap member 22 overlap the side walls of boss 20 and terminate short of axially extending abutments 32 and 34 formed on opposite sides of boss 20 at the base thereof. The rim portion 12 and web portion 16 define an open ended cavity 36 adapted to receive a conventional aircraft multiple disc brake assembly, not shown. Reference is made to U.S. Pat. No. 3,403,759 in the name of O. L. Holcomb, Jr. and assigned to the assignee of the present application for an example of a typical aircraft wheel and a multiple disc brake assembly therefor.

During an extended hard brake application such as occurs in the heretofore mentioned rejected take-off, the heat load imposed on the brake elements and, in particular, the conventional rotor and stator friction discs thereof, not shown, may be of such magnitude that metal and/or non-metal portions of the brake structure become semi-molten and discharged radially outwardly by the rotor friction discs. The rim portion 12, being exposed to the heated brake structure, will experience a temperature rise as a result of conventional radiation, convection and conduction heat transfer and as a result of the semi-molten brake debris thrown thereagainst which creates localized hot spots. The resulting temperature rise of the rim portion 12 as well as the pressurized tire mounted thereon, not shown, frequently results in structural deterioration of the rim portion 12 and/or tire and subsequent structural failure of the same.

Obviously, the above mentioned brake operating conditions creating the undesirable heat load on the rim portion 12 are an ever present hazard and may occur with no advance warning. A practical solution to the above mentioned problem is to provide a heat shield which establishes a barrier between the brake assemble and the rim portion 12 to minimize heat transfer to the latter and retain semi-molten brake debris radially inwardly away from the rim portion 12. To that end, the present heat shield is defined by a plurality of dual layer heat shield segments generally indicated by 38. Each heat shield segment 38 is removably secured in position between adjacent bosses 20 to establish a substantially continuous annular heat shield between the rim portion 12 and disc brake structure radially inwardly therefrom.

Each dual layer heat shield segment 38 is provided with a first generally rectangular metal plate 40 having a flat middle section 42 and side portions 44 and 46 extending angularly therefrom. A second generally rectangular metal plate 48 has a flat middle section 50 and side portions 52 and 54 extending angularly therefrom. The side portions 52 and 54 are adapted to bear against side portions 44 and 46, respectively, to establish a fixed spaced apart relationship between middle sections 42 and 50. The side portions 44 and 52 are spot welded together as at 56 and 58. Likewise, the side portions 46 and 54 are spot welded together as at 60 and 62.

The middle section 50 is provided with a plurality of parallel spaced apart rows of spaced apart frusto-conical shaped pockets 64 suitably formed therein as by stamping and of suitable depth to contact middle section 42. The base 66 of each pocket 64 is fixedly secured to middle section 42 by a conventional spot weld 68 thereby providing a rigid dual wall structure highly resistant to buckling, twisting or similar forms of deformation.

Figure 3:
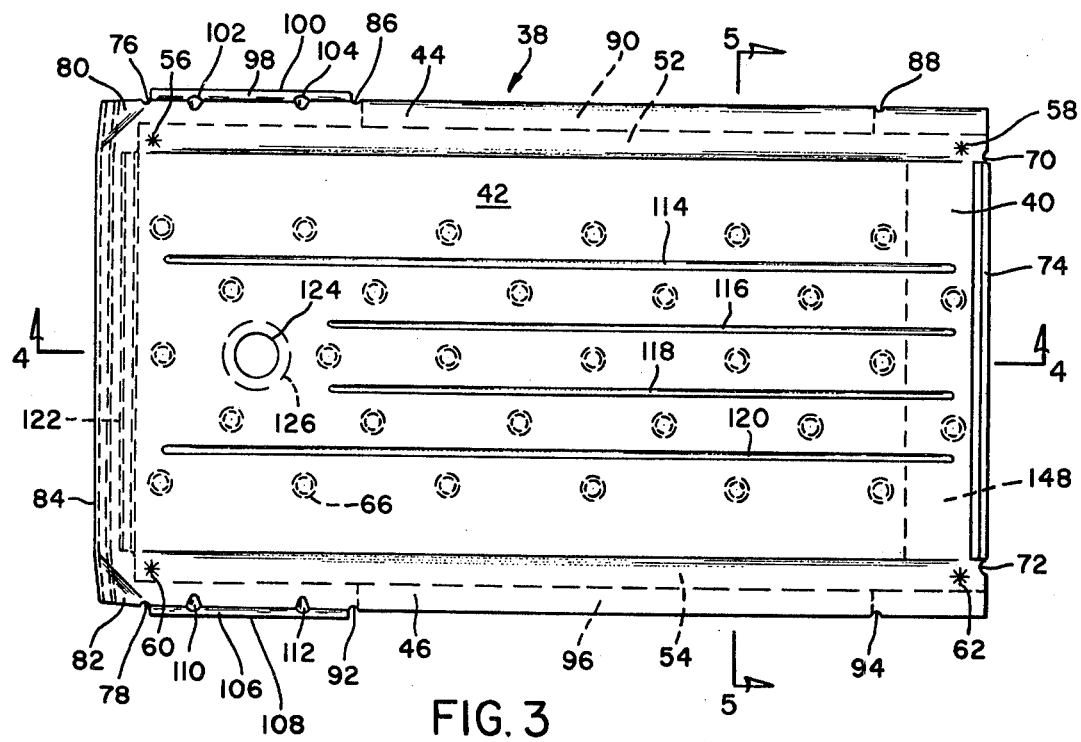
FIG. 3 is a plan view of the present invention shown removed from the wheel structure of FIG. 1.

As viewed in FIG. 3, the right hand edge of the middle section 42 is notched as at 70 and 72 and folded back to define a lip or rib 74. The left hand ends of side portions 44 and 46 are notched as at 76 and 78, respectively, and, as at 80 and 82, bent out of the plane of the respective side portions 44 and 46 to the extent necessary to form a continuous rolled edge 84 across the entire width of plate 40.

The side portion 44 is notched as at 86 and 88 and folded back therebetween as at 90. Likewise, the side portion 46 is notched as at 92 and 94 and folded back therebetween as at 96. The side portion 44 between notches 76 and 86 is bent at a right angle as at 98 and folded back as at 100 and further provided with spaced apart depressions 102 and 104 suitably formed in the right angle corner portion of side portion 44 to thereby resist flexing of the bent portion 98. Likewise, side portion 46 between notches 78 and 92 is bent at a right angle as at 106 and folded back as at 108 and further provided with spaced apart depressions 110 and 112 suitably formed in the right angle corner portion of side portion 46 to thereby resist flexing of the bent portion 106.

A plurality of spaced apart channels or grooves 114, 116, 118 and 120 suitably stamped in middle section 42 and extending longitudinally therein serve to structurally stiffen the same.

The second metal plate 48 is slightly shorter longitudinally relative to plate 40 and has one transverse edge arranged flush with the lip 74 of plate 40. The opposite transverse edge of plate 48 is rolled as at 122 across middle section 42 which, as in the case of rolled edge 84, eliminates exposure of sharp edges of the plates 40 and 48.

Figures 5, 6, 7:
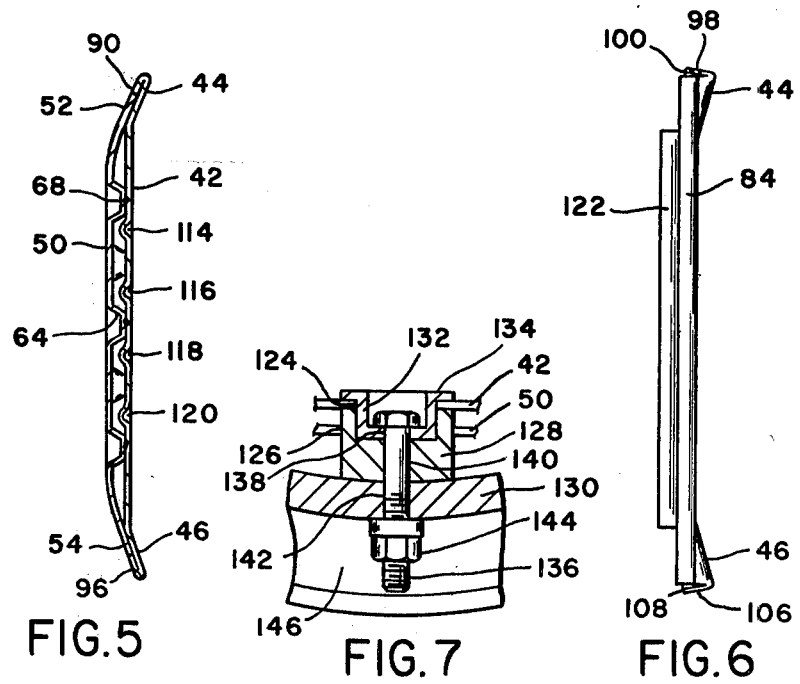
FIG. 5 is a section view taken on line 5—5 of FIG. 3.
FIG. 6 is an end view taken from the left hand end of the present invention as viewed in FIG. 3.
FIG. 7 is a section view taken on line 7—7 of FIG. 2.

An opening 124 in the middle section 40 is aligned with a relatively larger diameter opening 126 in middle section 50. Referring to FIG. 7, a cup shaped spacing member 128 extending through opening 126 into engagement with middle section 40 is adapted to bear against an annular flange 130 formed on rim portion 12. A hat-shaped retaining member 132 received by spacing member 128 is provided with a radially outward extending lip 134 which overlaps the middle section 40 immediately adjacent opening 124. A bolt 136 extends through suitable openings 138 and 140 in the bases of retaining member 132 and spacing member 128, respectively, as well as an opening 142 in flange 130 into threaded engagement with a nut 144 to thereby fixedly secure the spacing member 128 and plate 40 in position relative to rim portion 12. It will be noted that an annular recess 146 partially defined by annular flange 130 provides access to nut 140.

The metal plates 40 and 48 may be formed from any suitable sheet metal but preferably are formed from stainless steel sheet which has good strength characteristics and relatively low heat transfer and emissivity coefficients.

Figure 2:
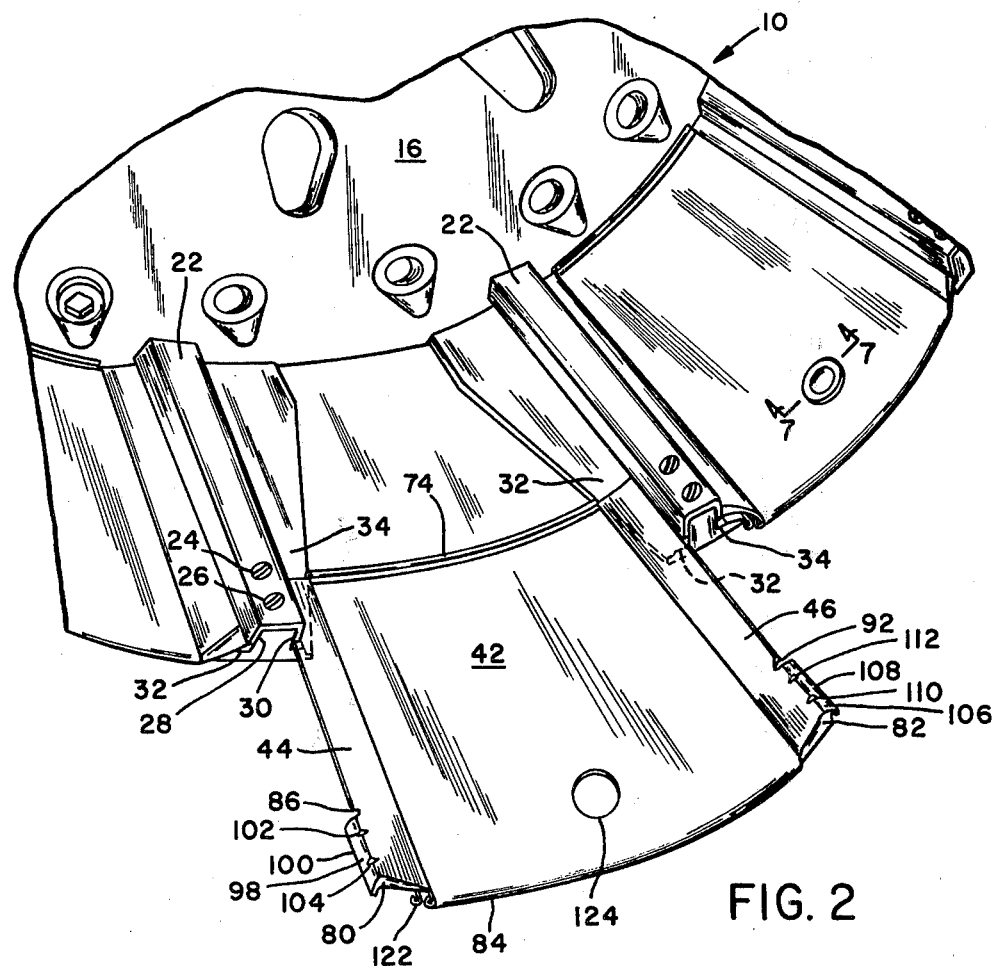
FIG. 2 is a view in perspective of the wheel of FIG. 1 and showing the present invention partially removed therefrom.

Referring to FIG. 2, the heat shield 38 is shown partially inserted axially in position in rim portion 12. The abutments 32 and 34 diverge laterally as at 148 and 150 thereby providing progressively greater support area for the heat shield 38 as the web portion 16 is approached. The side portions of shield 38 are slidably trapped between abutments 32 and 34 and respective side walls 28 and 30 thereby permitting the shield 38 to be pushed toward web portion 16 into position between bosses 20. The bent side portions 98 and 106 are guided into position between abutments 32 and 34 and respective side walls 28 and 30 which restrain side portions 44 and 46 against radial movement relative to bosses 20. The spacing member 128 and hat-shaped retaining member 132 are aligned with opening 142 and bolt 136 inserted through openings 138, 140 and 142 into engagement with nut 144 which is suitably tightened to fixedly secure heat shield 38 in position relative to rim portion 12.

Figure 4:
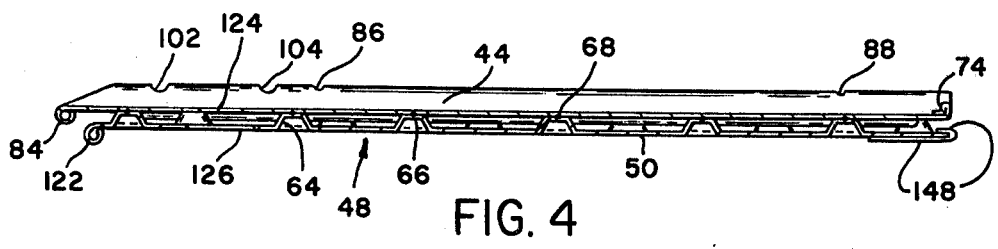
FIG. 4 is a section view taken on line 4—4 of FIG. 3.

Referring to FIG. 4, the portion of metal plate 48 slidably engaged with abutments 32 and 34 is preferably provided with a section of aluminum foil or similar material tape 148 suitably secured by an adhesive to the one side of middle section 50 and wrapped over the edge thereof into engagement with the opposite side of middle section 50 to thereby avoid metal-to-metal contact between middle section 50 and abutments 32, 34 as well as inner wall of rim portion 12. Such metal-to-metal contact is undesirable in view of the resulting chafing or scuffing of the rim portion 12 which tends to produce highly stressed cracks or the like in the rim portion 12.

It will be noted that the heat shields 38 may be quickly and easily installed or removed without removing adjacent structure of the wheel or disc brake.

The heat flow from the heated rotor and stator discs, not shown, to the rim portion 12 is substantially reduced by the metal plate 40 which tends to reflect and deflect heat passing radially outwardly from the heated rotor and stator discs via convection and radiant heat modes. The heat penetration through the heat shield 38 to the rim portion 12 is minimized by the air space between metal plates 40 and 48 through which air space air tends to circulate during movement of the wheel.

In the event of severe brake usage as in the case of the heretofore mentioned rejected take-off, the heat load imposed on the brake structure may be sufficient to reduce portions of the same to a semi-molten condition which semi-molten material is thrown outwardly by the rotor discs 22 against the adjacent heat shields 38. The mass of the semi-molten material and resulting centrifugal force thereof imposed on any given heat shield 38 has the tendency to force the same radially outwardly into contact with the rim portion 12. However, the above described structurally rigid dual layer heat shield 38 is capable of resisting twisting, buckling or the like of the shield 38 thereby maintaining the semi-molten material in radially spaced relationship to the rim portion 12. Furthermore, should the heat shield segment 38 be forced radially outwardly against rim portion 12 the metal plate 40 loaded by the semi-molten material will be held away from the metal plate 48 by pockets 64 thereby minimizing transfer of heat to the rim portion accordingly.

It will be understood that the heat shield 38 may take various forms other than that of the preferred embodiment shown and described above. For example, the shield 38 may be made arcuate to conform to the curvature of rim portion 12. Referring to U.S. Pat. No. 3,051,528, there is shown therein rotor disc drive key members of the removable type which are arranged in spaced apart relationship in the same manner as the drive key members 20 of the above described apparatus. The above described rim portion 12 may be easily modified to operate with the removable drive key members of U.S. Pat. No. 3,051,528 in which case substantially minor modifications of heat shield 26 may be required.

Various other modifications or changes in the above described dual layer heat shield may be made without departing from the scope of Applicant's invention as defined by the following claims.

We claim:

1. A wheel and heat shield therefor comprising in combination:
   a tire supporting wheel rim defining a brake cavity adapted to receive a brake assembly having rotatable and non-rotatable frictionally engageable members;
   a plurality of elongated drive key means fixedly secured to said wheel rim in circumferentially spaced apart formation and extending radially inwardly therefrom into engagement with said rotatable member;
   a plurality of heat shields removably secured in position between said plurality of drive key means to define a substantially continuous annular wall having a radially spaced relationship to said wheel rim;
   each of said heat shields including first and second spaced apart plate members fixedly secured together to define a rigid double wall structure having an air space therebetween and opposite side portions engaged with adjacent drive key means for supporting the heat shield in spaced apart relationship with said wheel rim; and
   fastening means including a spacing member operatively connected to said heat shield and said wheel rim for reinforcing said radially spaced relationship therebetween and fixedly securing said heat shield in position between said adjacent drive key means.

2. A wheel and heat shield therefor as claimed in claim 1 wherein:
   said first and second plate members are generally rectangular in shape and provided with flat middle sections and angularly extending side portions wherein the side portions of said first plate member engage the side portions of said second plate member and are fixedly secured thereto to establish a spaced apart relationship between said flat middle sections; and
   a plurality of spaced apart separating members extending from said flat middle section of said first plate member into fixed engagement with said flat middle section of said second plate member to reinforce said spaced apart relationship of said flat middle sections and structurally stiffen the same.

3. A wheel and heat shield therefor as claimed in claim 2 wherein:
   said spaced apart separating members are defined by a plurality of protrusions formed in said first plate member and to which said second plate member is fixedly secured.

4. A wheel and heat shield therefor as claimed in claim 2 wherein:
   said flat middle section of said second plate member is provided with a plurality of spaced apart longitudinally extending grooves formed therein to structurally stiffen the same.

5. A wheel and heat shield therefor as claimed in claim 1 wherein:
   said adjacent drive key means each include a longitudinally extending cap member for slidably receiving said opposite side portions to retain said heat shield in position between said adjacent drive key means.

6. A wheel and heat shield therefor as claimed in claim 1 wherein:
   said fastening means is engaged with a first end portion of said heat shield; and
   said wheel rim is provided with abutment means slidably engaged by a second end portion of said heat shield for supporting said heat shield against radial outward movement thereof during wheel rim rotation.

7. A wheel and heat shield therefor as claimed in claim 5 wherein:
   said second end portion is provided with a layer of relatively soft metallic tape to resist chafing of said wheel rim by said heat shield.

8. A wheel and heat shield therefor as claimed in claim 1 wherein:
   said first and second plate members are provided with rolled edge portions to eliminate exposed relatively sharp edges of said first and second plate members.

9. A wheel and heat shield therefor as claimed in claim 1 wherein:
   said first and second plate members are formed from stainless steel sheet metal.

10. A wheel and heat shield therefor as claimed in claim 1 wherein:
    said heat shield resists heat transfer radially outwardly from said rotatable and non-rotatable members toward said wheel rim and establishes a structurally rigid barrier to heated brake debris thrown radially outwardly by said rotatable member.

* * * * *